United States Patent
Kim et al.

(10) Patent No.: US 11,953,213 B2
(45) Date of Patent: Apr. 9, 2024

(54) AIR CONDITIONER

(71) Applicant: Samsung Electronics Co., Ltd., Suwon-si (KR)

(72) Inventors: Kyoung-Rock Kim, Suwon-si (KR); Joon-Ho Yoon, Suwon-si (KR); Jung Ho Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 574 days.

(21) Appl. No.: 16/953,967

(22) Filed: Nov. 20, 2020

(65) Prior Publication Data

US 2021/0071880 A1 Mar. 11, 2021

Related U.S. Application Data

(63) Continuation of application No. 15/397,304, filed on Jan. 3, 2017, now abandoned.

(30) Foreign Application Priority Data

Jan. 15, 2016 (KR) ........................ 10-2016-0005641

(51) Int. Cl.
*F24F 1/0011* (2019.01)
*F21V 33/00* (2006.01)
(Continued)

(52) U.S. Cl.
CPC .......... *F24F 1/0011* (2013.01); *F24F 1/0047* (2019.02); *F24F 1/0063* (2019.02);
(Continued)

(58) Field of Classification Search
CPC ...... F24F 1/0011; F24F 1/0047; F24F 1/0063; F24F 1/0073; F24F 11/30; F24F 11/76;
(Continued)

(56) References Cited

U.S. PATENT DOCUMENTS 3,173,616 A   3/1965  Lipscomb
4,151,811 A * 5/1979  Truhan .................. A01K 31/18
                                                       119/439
(Continued)

FOREIGN PATENT DOCUMENTS

EP    2 607 799 A1   6/2013
EP    2827072 A1     1/2015
(Continued)

OTHER PUBLICATIONS

European Office Action dated May 30, 2022, issued in European Patent Application No. 16 205 728.5.
(Continued)

*Primary Examiner* — Steven B McAllister
*Assistant Examiner* — Charles R Brawner
(74) *Attorney, Agent, or Firm* — Jefferson IP Law, LLP (57) ABSTRACT

An air conditioner that further provides a lighting function is provided. The air conditioner can increase space utilization of a ceiling by the lighting device being integrally installed in the indoor unit. In addition, heat generated at the lighting device can be radiated by the cooling structure provided in the indoor unit, and thereby overheating of the lighting device can be prevented. The air conditioner includes a blowing fan configured to flow air, a housing in which an intake port is formed to suction air by the blowing fan, a lighting device provided in the housing, and a cooling channel configured to guide the air suctioned by the blowing fan to pass the lighting device.

19 Claims, 5 Drawing Sheets

(51) Int. Cl.
*F24F 1/0047* (2019.01)
*F24F 1/0063* (2019.01)
*F24F 11/30* (2018.01)
*F24F 11/63* (2018.01)
*F24F 11/76* (2018.01)
*F24F 11/77* (2018.01)
*F24F 13/078* (2006.01)
*F24F 13/14* (2006.01)
*F24F 110/10* (2018.01)
*F24F 1/0073* (2019.01)

(52) U.S. Cl.
CPC ............. *F24F 11/30* (2018.01); *F24F 11/63* (2018.01); *F24F 11/76* (2018.01); *F24F 11/77* (2018.01); *F24F 13/078* (2013.01); *F24F 13/14* (2013.01); *F21V 33/0088* (2013.01); *F24F 1/0073* (2019.02); *F24F 2110/10* (2018.01); *F24F 2221/02* (2013.01)

(58) Field of Classification Search
CPC .......... F24F 11/77; F24F 13/078; F24F 13/14; F24F 2110/10; F24F 5/0096; F21V 33/0088
USPC ........................................................ 454/229
See application file for complete search history.

(56) References Cited

U.S. PATENT DOCUMENTS

| | | | |
|---|---|---|---|
| 5,755,103 A | 5/1998 | Na et al. | |
| 7,083,659 B1 | 8/2006 | Joyce et al. | |
| 7,470,043 B2 | 12/2008 | Mehta | |
| 8,382,332 B2 | 2/2013 | Zakula et al. | |
| 8,641,375 B2 | 2/2014 | Tian et al. | |
| 8,651,704 B1 | 2/2014 | Gordin et al. | |
| 9,574,781 B2 | 2/2017 | Tsuji | |
| 9,671,100 B2 | 6/2017 | Schreiber | |
| 2004/0244403 A1 | 12/2004 | Kim et al. | |
| 2010/0009621 A1* | 1/2010 | Hsieh | F24F 7/007 454/349 |
| 2010/0085752 A1 | 4/2010 | Zheng | |
| 2010/0170276 A1 | 7/2010 | Kang et al. | |
| 2010/0175418 A1 | 7/2010 | Choi et al. | |
| 2011/0000566 A1 | 6/2011 | Ruponen et al. | |
| 2012/0180665 A1 | 7/2012 | Jeong et al. | |
| 2012/0214399 A1 | 8/2012 | Tsuji | |
| 2013/0315731 A1 | 11/2013 | Yang et al. | |
| 2014/0078718 A1 | 3/2014 | Li et al. | |
| 2014/0185305 A1 | 7/2014 | Takahashi | |
| 2015/0105013 A1 | 4/2015 | Jeong et al. | |
| 2015/0138780 A1* | 5/2015 | Yoshizawa | F21V 29/677 362/373 |
| 2016/0238029 A1 | 8/2016 | Avedon | |

FOREIGN PATENT DOCUMENTS

| | | |
|---|---|---|
| FR | 2 850 303 A1 | 7/2004 |
| JP | S61-127340 U | 8/1986 |
| JP | H11-201494 A | 7/1999 |
| JP | 2004053235 A | 2/2004 |
| JP | 2014-044935 A | 3/2014 |
| KR | 10-2011-0088634 A | 8/2011 |
| KR | 10-1156554 B1 | 6/2012 |
| KR | 10-2012-0087975 A | 8/2012 |
| KR | 10-2013-0045969 A | 5/2013 |
| WO | 2010/046536 A1 | 4/2010 |

OTHER PUBLICATIONS

European Office Action dated Nov. 25, 2022, issued in European Patent Application No. 16 205 728.5.
Chinese Office Action dated Mar. 2, 2021, issued in Chinese Application No. 201710028797.X.
Chinese Office Action dated Feb. 3, 2020, issued in a counterpart Chinese application No. 201710028797.X.
European Office Action dated Aug. 21, 2019, issued in a counterpart European application No. 16 205 728.5-1008.
Korean Office Action dated Sep. 8, 2022 issued in Korean Patent Application No. 10-2016-0005641.
Korean Notice of Allowance with English translation dated Feb. 24, 2023; Korean Appln. No. 10-2016-0005641.

* cited by examiner

AIR CONDITIONER

CROSS-REFERENCE TO RELATED APPLICATION(S)

This application is a continuation application of prior application Ser. No. 15/397,304, filed on Jan. 3, 2017, which was based on and claimed priority under 35 U.S.C. § 119(a) of a Korean patent application number 10-2016-0005641, filed on Jan. 15, 2016 in the Korean Intellectual Property Office, the disclosure of which is incorporated by reference herein in its entirety.

TECHNICAL FIELD

The present disclosure relates to an air conditioner including a lighting device.

BACKGROUND

An air conditioner is an apparatus which maintains comfortable indoor air suitable for human activity using a refrigeration cycle. A general air conditioner may maintain an optimal indoor temperature by cooling or heating air surrounding a heat exchanger according to a phase change of a refrigerant which flows in the heat exchanger and discharging the cooled or heated air indoors.

An air conditioner is provided with a refrigeration cycle in which a refrigerant circulates through a compressor, a condenser, an expansion valve, and an evaporator in a forward or reverse direction, wherein the compressor provides a gaseous refrigerant at a high temperature and high pressure and the condenser provides a liquid refrigerant at room temperature and high pressure. The expansion valve decompresses the liquid refrigerant at room temperature and high pressure, and the evaporator evaporates the decompressed refrigerant into a gaseous state at a low temperature.

In the case of a separated type air conditioner for which each of an indoor unit and outdoor unit are separately installed, the indoor unit may be installed at a ceiling for efficient utilization of an indoor space. The indoor unit may be provided with a discharge port which discharges air cooled or heated by a heat exchanger. The discharge port may be provided with a blade which guides movement of air. The blade may be provided to be rotatable by a drive unit. A direction of an air current discharged may be controlled by the blade being rotated by the drive unit.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an air conditioner capable of also performing a function of a lighting device by an indoor unit being installed at a ceiling.

Another aspect of the present disclosure is to provide an air conditioner capable of radiating heat generated at a lighting device by a cooling structure being provided in an indoor unit.

In accordance with an aspect of the present disclosure, an air conditioner is provided. The air conditioner includes a blowing fan configured to flow air, a housing in which an intake port is formed to suction air by the blowing fan, a lighting device provided in the housing, and a cooling channel configured to guide the air suctioned by the blowing fan to pass the lighting device.

The lighting device may be positioned along an outer perimeter of the intake port.

The lighting device and the intake port may be positioned at a panel positioned at a lower portion of the housing.

The intake port may be provided in an annular shape.

The housing may be provided with a suction channel in communication with the intake port to guide the suctioned air to a heat exchanger, and one side of the cooling channel may be in communication with the suction channel.

The housing may be provided with a discharge port configured to extend along an outer perimeter of the intake port.

The lighting device may be positioned between the intake port and the discharge port.

The lighting device may comprise a light source configured to emit light and a heat sink configured to radiate heat generated at the light source.

The cooling channel may be provided so that the air suctioned via the cooling channel passes the heat sink.

The heat sink may be provided with a metallic material comprising aluminum.

The lighting device may be further provided with a temperature sensor configured to sense a temperature of the heat sink.

The blowing fan may be further configured to operate according to a result sensed by the temperature sensor.

When a heating or cooling operation is not performed, the blowing fan may operate when the temperature sensed by the temperature sensor is higher than a certain or preset temperature.

The blowing fan may operate at a lower speed when the heating or cooling operation is not performed than when the heating or cooling operation is performed.

The blowing fan may stop operating when the temperature sensed by the temperature sensor is less than the certain or preset temperature.

In accordance with another aspect of the present disclosure, an air conditioner is provided. The air conditioner includes a housing in which an intake port in an annular shape and a discharge port positioned at an outer side of a suction channel in a radial direction are formed, a blowing fan positioned inside the housing and configured to flow air, a lighting device installed in the housing, and a cooling channel provided at the housing and configured to guide suctioned air to pass a heat sink. The lighting device may comprise a light source installed at the housing and the heat sink may be configured to radiate heat generated at the light source.

The lighting device may be positioned at a lower surface of the housing.

The cooling channel may be positioned between the suction channel and a discharge channel.

The lighting device may further comprise a temperature sensor configured to sense a temperature of the heat sink.

When a heating or cooling operation is not performed, the blowing fan may operate for a certain or predetermined time when the temperature of the heat sink sensed by the temperature sensor is higher than a certain or preset temperature.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, an air conditioner according to an embodiment will be described in detail with reference to the accompanying drawings.

Figure 1:
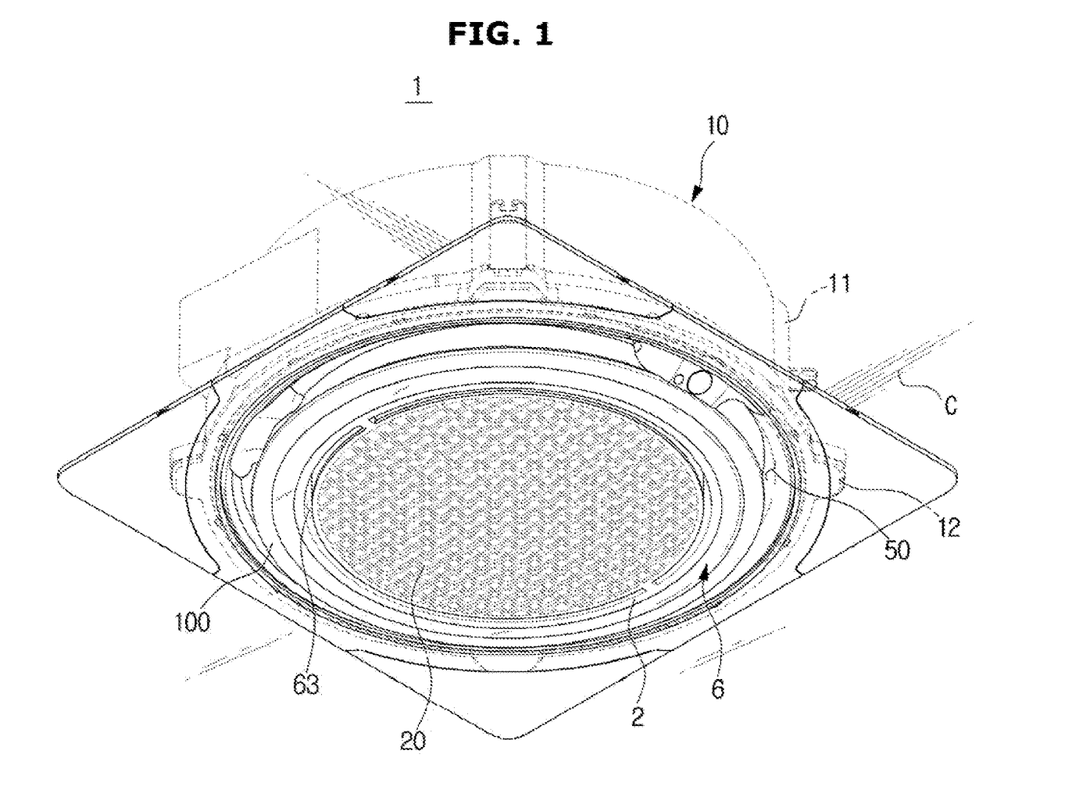
FIG. 1 is a view illustrating an air conditioner according to an embodiment of the present disclosure.
Figure 2:
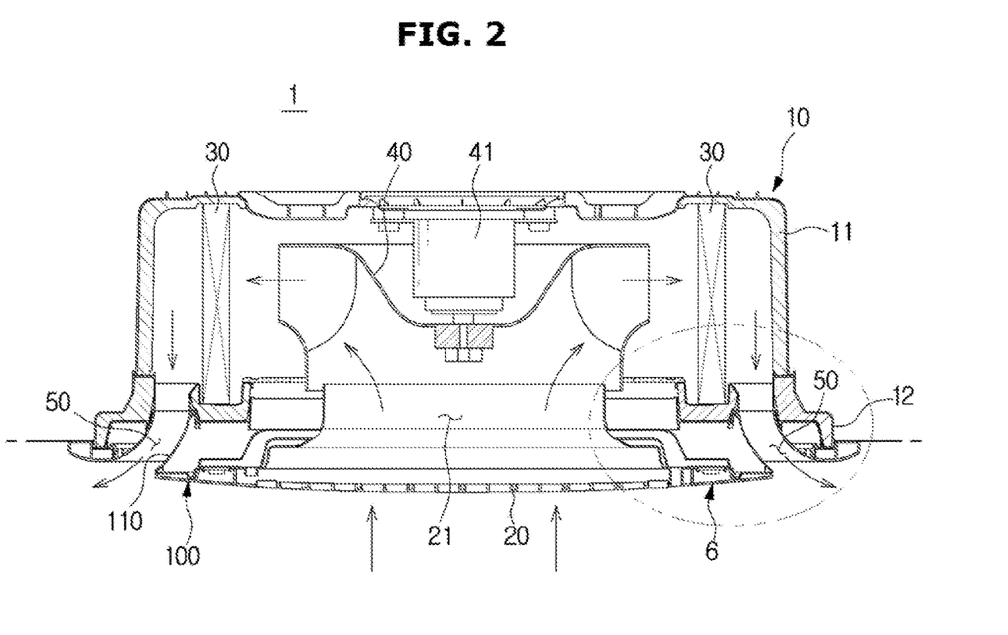
FIG. 2 is a side cross-sectional view of an air conditioner according to an embodiment of the present disclosure.
Figure 3:
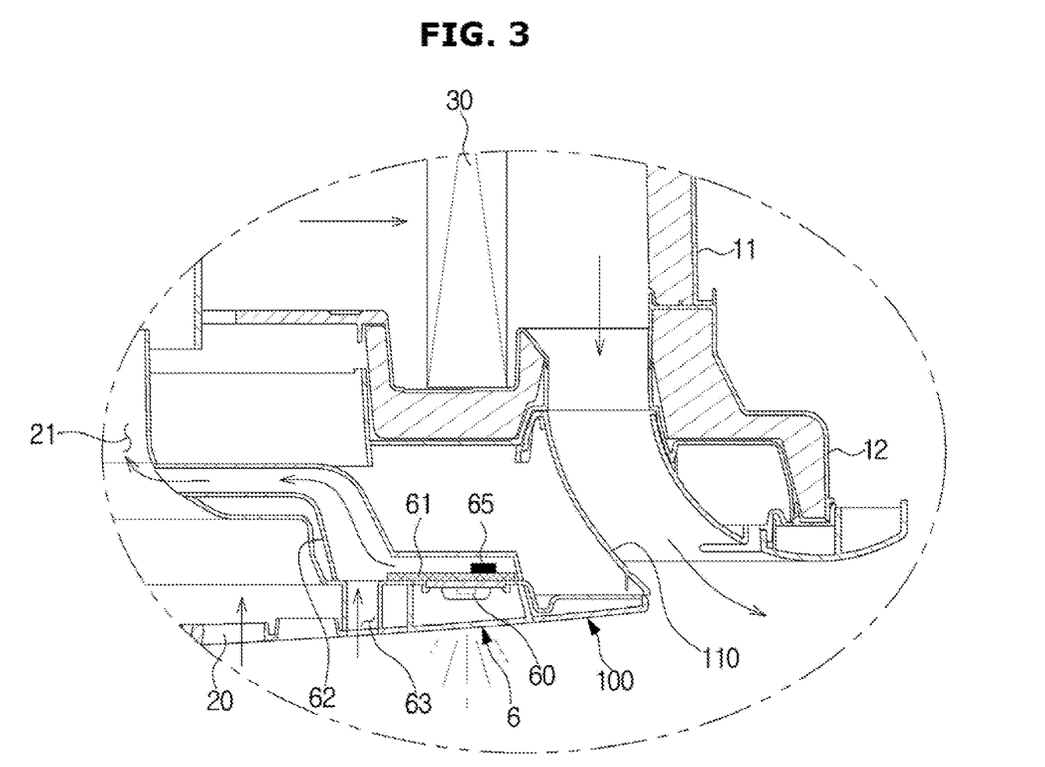
FIG. 3 is a view illustrating a portion of the air conditioner shown in FIG. 2 according to an embodiment of the present disclosure.

FIG. 1 is a view illustrating an air conditioner according to an embodiment of the present disclosure, FIG. 2 is a side cross-sectional view of an air conditioner according to an embodiment of the present disclosure, and FIG. 3 is a view illustrating a portion of the air conditioner shown in FIG. 2 according to an embodiment of the present disclosure.

Referring to FIGS. 1 to 3, an air conditioner 1 according to one embodiment may include an indoor unit and an outdoor unit. The indoor unit may be installed at a ceiling C of an indoor space. At least a portion of the indoor unit may be embedded in the ceiling C. Hereinafter, the air conditioner 1 installed at the ceiling C refers to the indoor unit.

The air conditioner 1 may include a housing 10 provided in a substantially cylindrical shape, a heat exchanger 30 provided inside the housing 10, and a blowing fan 40 which flows air.

The housing 10 may be provided to have a substantially circular shape when viewed from a vertical direction. The shape of the housing 10 is not limited to the circular shape. The housing 10 may include an upper housing 11 and a lower housing 12 coupled to a lower portion of the upper housing 11.

When the air conditioner 1 is embedded in the ceiling C, the upper housing 11 may be disposed inside the ceiling C. The lower housing 12 may be coupled to the lower portion of the upper housing 11 to be exposed to the outside. The shape of the housing 10 is not limited to the above descriptions. For example, an intermediate housing may be further provided between the upper housing 11 and the lower housing 12. In addition, when the air conditioner 1 is not embedded in the ceiling C but installed outside the ceiling C, both the upper housing 11 and the lower housing 12 may be provided to be exposed to the outside.

An intake port 20 into which air is suctioned may be disposed at a central portion of the lower housing 12, and a discharge port 50 through which air heat-exchanged by the heat exchanger 30 is discharged may be provided at an outer side of the intake port 20 in a radial direction. The air suctioned through the intake port 20 may be heat-exchanged by the heat exchanger 30 provided inside the air conditioner 1 and discharged through the discharge port 50.

The lower housing 12 is provided with a lower panel 2 which forms a bottom surface of the air conditioner 1, and the intake port 20 may be formed at a central portion of the lower panel 2. The lower panel 2 may be provided in a circular plate shape. The discharge port 50 may be provided in an annular shape at an outer side of the lower panel 2.

An air current control unit 100 may be disposed at the lower housing 12. The air current control unit 100 may be provided in a substantially cylindrical shape and provided at the lower housing 12. The air current control unit 100 may be provided to receive a driving force from a driving source (not shown) and be lifted and lowered.

An outer circumferential surface 110 of the air current control unit 100 may form one side surface of a discharge channel which is in communication with the discharge port 50. An inner circumferential surface of the air current control unit 100 may form a suction channel 21 which connects the intake port 20 and the blowing fan 40 so that air suctioned via the intake port 20 is introduced into the blowing fan 40.

An air current discharged via the discharge port 50 may be varied by the air current control unit 100. For example, a curved surface may be formed at a lower portion of the air current control unit 100. A lower end portion of the curved surface may be provided to face an outer side of the discharge port 50 in a radial direction. The air current control unit 100 may be lifted and lowered to change an air current of the air discharged from the discharge port 50.

The discharge port 50 through which air heat-exchanged by the heat exchanger 30 is discharged may be provided at the outer side of the intake port 20 in the radial direction. The discharge port 50 may be provided in a substantially annular shape. The discharge port 50 may be disposed at an outer side of the heat exchanger 30 in a radial direction.

The discharge channel may be provided inside the housing 10 to communicate with the discharge port 50. One side of the discharge channel may be connected to the heat exchanger 30 and the other side may be connected to the discharge port 50. The air suctioned via the intake port 20 may be heat-exchanged by the heat exchanger 30, pass through the discharge channel, and be discharged to the outside via the discharge port 50.

Meanwhile, a filter (not shown) may be provided at an upper side of the intake port 20 to filter dust included in the air suctioned through the intake port 20.

The heat exchanger 30 is provided inside the housing 10, and may be disposed in an air channel between the intake port 20 and the discharge port 50. The heat exchanger 30 may include tubes (not shown) in which a refrigerant flows and a header (not shown) connected to outside refrigerant pipes for supplying the refrigerant to the tubes or recovering the refrigerant from the tubes. The tubes may be provided with a plurality of heat exchanger fins to widen a heat radiating area.

The heat exchanger 30 may be provided to have a substantially annular shape when viewed from the vertical direction. The shape of the heat exchanger 30 may be provided to correspond to the shape of the housing 10. The shape of the heat exchanger 30 may be provided to correspond to the shape of the discharge port 50. The drain tray may be provided below the heat exchanger 30. Condensate generated at the heat exchanger 30 may be collected by the drain tray. For example, the heat exchanger 30 may be disposed in the drain tray.

The blowing fan 40 may be provided at an inner side of the heat exchanger 30 in a radial direction. The blowing fan 40 may be a centrifugal fan which suctions air in an axial direction and discharges the air in a radial direction. The air conditioner 1 may be provided with a blower motor 41 for driving the blowing fan 40.

With the above-described configuration, the air conditioner 1 may suction indoor air, cool the suctioned air, and discharge the cooled air indoors, or may suction indoor air, heat the suctioned air, and discharge the heated air indoors.

A lighting device 6 may be provided at a lower portion of the air conditioner 1. The lighting device 6 may be installed at the lower housing 12. The lighting device 6 may be provided to be on the same plane as the lower panel 2. The intake port 20 is formed at the central portion of the lower panel 2, and the lighting device 6 may be disposed at the outer side of the intake port 20. The lighting device 6 may be provided in an annular shape to surround the outer side of the intake port 20. As another example, a plurality of lighting devices 6 may be provided at the outer side of the intake port 20 and positioned to be separated from each other by a predetermined distance.

A lighting device according to the related art is not able to be positioned at a position at which an air conditioner is installed, but needs to be positioned around the air conditioner. Accordingly, when the air conditioner 1 is installed and the air conditioner 1 interferes with a lighting device, a nearby area may become dark as the lighting device is not able to be positioned around the air conditioner 1. Alternatively, to prevent the above case, a lighting device needs to be additionally installed around the air conditioner or a position at which the air conditioner 1 is installed needs to be moved.

However, in the embodiment of the present disclosure, since the lighting device 6 is integrally installed at the air conditioner 1, space utilization of the ceiling C may be increased. When the air conditioner 1 is installed according to the embodiment of the present disclosure, a nearby area of the air conditioner 1 may be prevented from becoming dark due to the air conditioner 1 interfering with a lighting device. In addition, a range of choice on a position of the air conditioner 1 may be expanded because it is not necessary to move the air conditioner 1 or install additional lighting due to interference with a lighting device.

As described above, since the lighting device 6 is integrally installed in the air conditioner 1, the space utilization of the ceiling C at which the air conditioner 1 is installed may be increased.

The lighting device 6 includes a light source 60 which emits light. A light emitting diode (LED) may be used as the light source 60. Types of the light source 60 are not limited to the LED and various types of light source may be used.

The lighting device 6 may further include a heat sink 61 which may radiate heat generated at the light source 60. The heat sink 61 may be provided with a metallic material such as aluminum or the like having a high thermal conductivity. The heat sink 61 may be installed at one side of the light source 60 to quickly radiate heat received from the light source 60.

As described above, since the heat sink 61 is installed at the light source 60 and quickly radiates the heat generated at the light source 60, overheating of the light source 60 may be prevented.

A temperature of the heat sink 61 may increase when the heat received from the light source 60 is larger than heat radiated by the heat sink 61. When the temperature of the heat sink 61 increases, the heat sink 61 may not efficiently radiate the heat generated at the light source 60. Therefore, a cooling structure which may cool the heat sink 61 may be provided at the lower housing 12. Hereinafter, a cooling structure which may cool the heat sink 61 will be described.

A cooling intake port 63 may be formed at one side of the lower housing 12. For example, the cooling intake port 63 may be formed at the lower panel 2. Air suctioned via the cooling intake port 63 may pass through the light source 60 and the heat sink 61. A cooling channel 62 which guides the air suctioned via the cooling intake port 63 to pass the heat sink 61 may be further provided at the lower housing 12. One side of the cooling channel 62 may be connected to the cooling intake port 63 and the other side may be connected to the suction channel 21.

Outside air may be suctioned via the cooling intake port 63 by a suction force of the blowing fan 40. The air suctioned via the cooling intake port 63 may flow through the cooling channel 62 and pass the heat sink 61. When the heat sink 61 is at a high temperature due to the heat received from the light source 60, the heat sink 61 may exchange heat with the air flowing through the cooling channel 62. Heat of the heat sink 61 is transferred to the air flowing through the cooling channel 62, and thereby the temperature of the heat sink 61 may be lowered. The air suctioned via the cooling intake port 63 may exchange heat with the heat sink 61, move to the suction channel 21, join the air suctioned via the intake port 20, and move to the heat exchanger 30.

As described above, the temperature of the heat sink 61 may be lowered by the air suctioned by the blowing fan 40. Since the temperature of the heat sink 61 is lowered by the suctioned air, the heat sink 61 may efficiently receive and radiate the heat generated at the light source 60.

When only the light source 60 is turned on while a heating or cooling operation of the air conditioner 1 is turned off, air is not suctioned to the cooling channel 62 because the blowing fan 40 does not operate. When air is not suctioned to the cooling channel 62, radiation efficiency of the heat sink 61 may be decreased.

To prevent the radiation efficiency from decreasing, the heat sink 61 may be cooled by intermittently operating only the blowing fan 40 even in a state in which the heating or cooling operation of the air conditioner 1 is turned off.

The lighting device 6 may further include a temperature sensor 65 which senses the temperature of the heat sink 61. When a temperature sensed by the temperature sensor 65 is higher than a preset temperature, a controller comprising at least one processor (not shown) may operate the blowing fan 40. The blowing fan 40 may operate for a preset time or until the temperature sensed by the temperature sensor 65 is less than the preset temperature.

The blowing fan 40 may be operated at a lower speed than when the heating or cooling operation of the air conditioner 1 is performed. Air may flow through the cooling channel 62 by the operation of the blowing fan 40. The temperature of the heat sink 61 may be lowered by exchanging heat with the air flowing through the cooling channel 62. Accordingly, the heat generated at the light source 60 may be efficiently radiated.

Although the embodiment in which the blowing fan 40 operates according to the temperature sensed by the temperature sensor 65 is described above, the blowing fan 40 may also be operated based on different types of methods. As an example, the blowing fan 40 may be provided to operate for a preset time at predetermined time intervals when the heating or cooling operation of the air conditioner 1 is not performed. The blowing fan 40 may also be set to intermittently operate or be provided to continuously operate at a low speed even when the heating or cooling operation of the air conditioner 1 is not performed, i.e., the heating or cooling operation of the air conditioner 1 is turned off.

As described above, since the temperature of the heat sink 61 is provided to be lowered by the air flowing through the cooling channel 62, volume of the heat sink 61 may be reduced. The heat sink 61 may efficiently radiate the heat generated at the light source 60. Accordingly, the heat sink 61 may prevent lifetime expectancy of the light source 60 from being shortened due to a high temperature.

Figure 4:
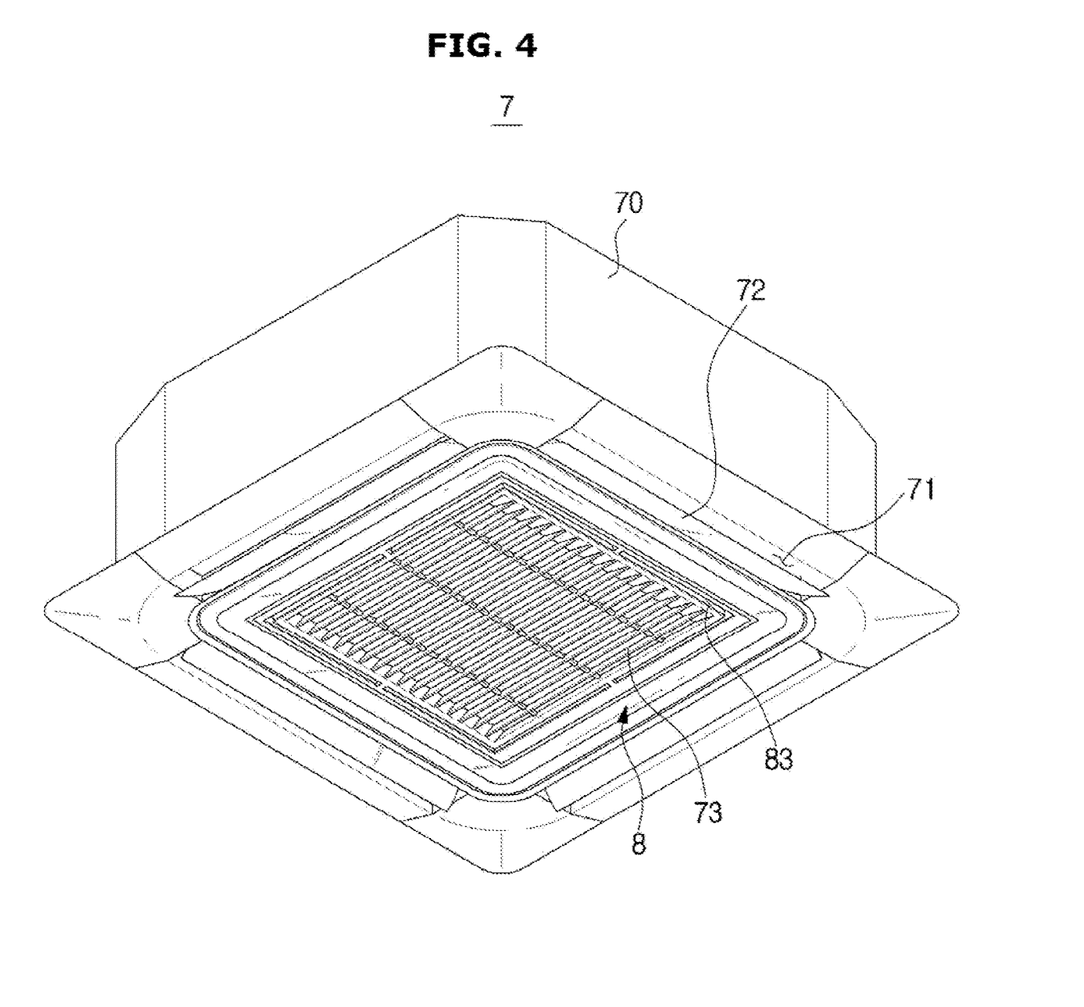
FIG. 4 is a view illustrating an air conditioner according to an embodiment of the present disclosure.
Figure 5:
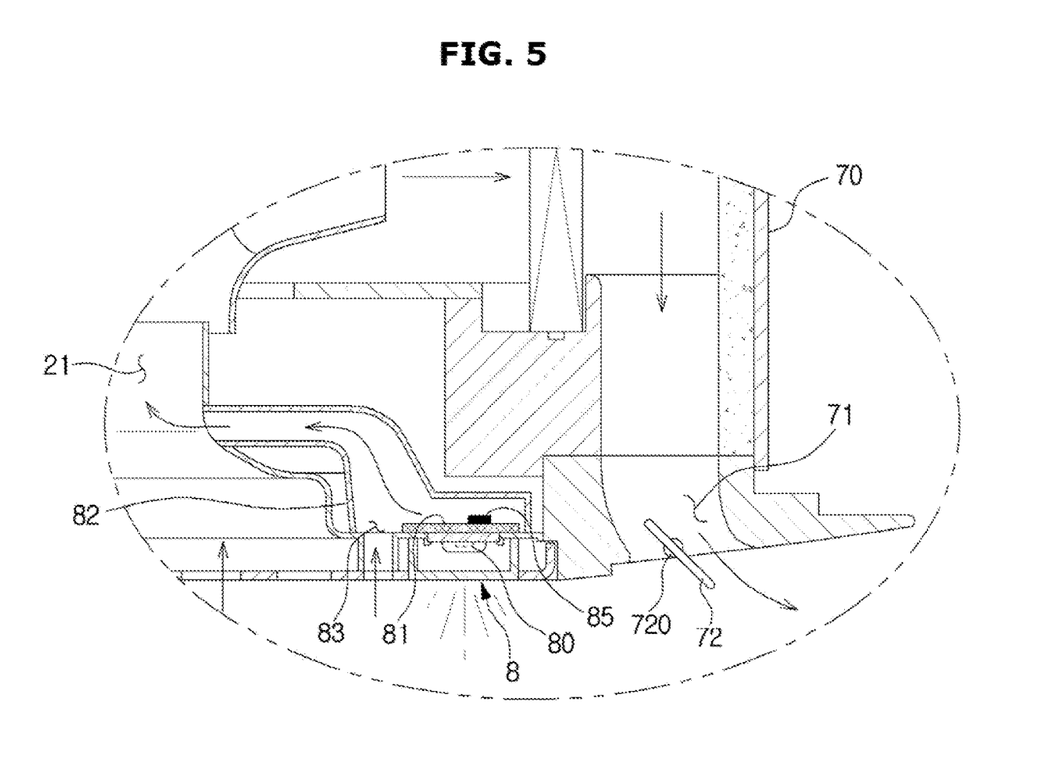
FIG. 5 is a view illustrating a portion of a side cross-section of an air conditioner according to an embodiment of the present disclosure.

FIG. 4 is a view illustrating an air conditioner according to an embodiment of the present disclosure, and FIG. 5 is a view illustrating a portion of a side cross-section of an air conditioner according to an embodiment of the present disclosure.

Referring to FIGS. 4 and 5, an air conditioner 7 according to an embodiment of the present disclosure is an air conditioner installed at a ceiling and has a quadrangular shaped lower surface. Similarly to the air conditioner 1 illustrated in FIGS. 1 to 3, a blowing fan and a heat exchanger may be provided inside a housing 70.

The air conditioner 7 may be different from the air conditioner 1 illustrated in FIGS. 1 to 3 in terms of an overall exterior, but the configuration of the lighting device 6 applied to the air conditioner 1 illustrated in FIGS. 1 to 3 may be similarly applicable to a configuration of a lighting device 8.

An intake port 73 may be installed at a central portion of a lower surface of the housing 70, and a discharge port 71 through which air heat-exchanged by the heat exchanger is discharged may be positioned at an outer side of the intake port 73. A blade 72 provided to be rotatable about a rotating shaft 720 may be provided at a side of the discharge port 71. By varying an angle of the blade 72, an air current direction of the air discharged via the discharge port 71 may be varied.

The lighting device 8 may be provided between the intake port 73 and the discharge port 71. The lighting device 8 may be positioned on the same plane as the intake port 73. The lighting device 8 may include a light source 80 and a heat sink 81 connected to the light source 80 to radiate heat generated at the light source 80. The heat sink 81 may be provided with a temperature sensor 85 which senses a temperature of the heat sink 81.

The housing 70 may be provided with a cooling channel 82 which guides air suctioned by the blowing fan to pass the heat sink 81. One side of the cooling channel 82 may communicate with the suction channel 21 and the other side may communicate with a cooling intake port 83 formed at the lower surface of the housing 70. Air suctioned via the cooling intake port 83 may pass through a space in which the heat sink 81 is positioned by the cooling channel 82. The suctioned air passing the heat sink 81 may cool the heat sink 81.

When the temperature of the heat sink 81 sensed by the temperature sensor 85 is higher than a preset temperature, a controller comprising at least one processor (not shown) may operate the blowing fan for a predetermined time or until the temperature of the heat sink 81 is less than the preset temperature even when a heating or cooling operation of the air conditioner 7 is not performed.

As described above, since the lighting device 8 is integrally installed in the air conditioner 7 installed at the ceiling, space utilization of the ceiling at which the air conditioner 7 is installed may be increased. In addition, since heat radiation of the lighting device 8 is efficiently performed by the cooling channel 82, overheating of the lighting device 8 may be prevented.

The air conditioner according to an embodiment can increase space utilization of a ceiling by the lighting device being integrally installed in the indoor unit.

In addition, heat generated at the lighting device can be radiated by the cooling structure provided in the indoor unit, and thereby overheating of the lighting device can be prevented.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An air conditioner comprising:
   a housing;
   a heat exchanger provided in the housing;
   a lower panel having a circular shape and separably coupled to the housing;
   an intake port formed on the lower panel and configured to draw in air so that air flows through the heat exchanger;
   a discharge port configured to:
   discharge air passing through the heat exchanger, and
   discharge air through an annular region between the lower panel and the housing;
   a lighting device having a substantially annular shape, including a light source provided in the housing, and configured to emit light;
   a cooling intake port configured to draw in air so that the air flows toward the lighting device, the cooling intake port having at least partially an annular shape;
   a suction channel in communication with the intake port; and
   a cooling channel configured to connect the cooling intake port to the suction channel and to guide a part of air suctioned in through the cooling intake port to flow around the lighting device, wherein the suction channel is in communication with the cooling intake port such that the suction channel guides the air drawn in from the cooling intake port to the heat exchanger.

2. The air conditioner of claim 1, wherein the lighting device is positioned along an outer perimeter of the cooling intake port.

3. The air conditioner of claim 2, wherein the intake port and the cooling intake port are formed at the lower panel positioned at a lower portion of the housing.

4. The air conditioner of claim 1,
wherein at least one side of the cooling channel is in communication with the suction channel.

5. The air conditioner of claim 1, wherein the discharge port extends along an outer perimeter of at least one of the intake port or the cooling intake port.

6. The air conditioner of claim 5, wherein the lighting device is positioned between the cooling intake port and the discharge port.

7. The air conditioner of claim 1, wherein the lighting device comprises:
a heat sink for radiating heat generated at the lighting device.

8. The air conditioner of claim 7, wherein the cooling channel is provided so that the air suctioned via the cooling channel draws air in near the heat sink.

9. The air conditioner of claim 8, wherein the heat sink is provided with a metallic material comprising aluminum.

10. The air conditioner of claim 7, wherein the lighting device comprises a temperature sensor for sensing a temperature of the heat sink.

11. The air conditioner of claim 10, further comprising:
a blowing fan provided in the housing to generate air flow,
wherein the blowing fan operates according to a result sensed by the temperature sensor.

12. The air conditioner of claim 11, wherein, in case a heating or cooling operation is not performed, the blowing fan operates based on the temperature sensed by the temperature sensor being higher than a preset temperature.

13. The air conditioner of claim 12,
wherein the blowing fan operates at a lower speed based on the heating or cooling operation not being performed, and
wherein the blowing fan operates at a higher speed based on the heating or cooling operation being performed.

14. The air conditioner of claim 12, wherein the blowing fan stops operating based on the temperature sensed by the temperature sensor being less than the preset temperature.

15. An air conditioner comprising:
a housing;
a blowing fan positioned in the housing to generate air flow;
an intake port configured to suction air by the blowing fan and formed at the housing;
a heat exchanger provided in the housing and configured to cool air suctioned by the blowing fan;
a discharge port configured to discharge air passing through the heat exchanger, the discharge port having an annular shape;
a lighting device having a substantially annular shape and including a light source provided in the housing and configured to emit light;
a cooling intake port configured to draw in air to flow toward the lighting device, the cooling intake port having at least partially an annular shape; and
a cooling channel configured to connect the cooling intake port to a suction channel and guide a part of air drawn in by the cooling intake port to flow around the lighting device,
wherein the suction channel is in communication with the intake port and the cooling intake port such that the suction channel guides the air drawn in from the cooling intake port to the heat exchanger.

16. The air conditioner of claim 15, wherein the lighting device is positioned at a lower surface of the housing.

17. The air conditioner of claim 15, further comprising:
a discharge channel in communication with the discharge port,
wherein the cooling channel is positioned between the suction channel and the discharge channel.

18. The air conditioner of claim 15, wherein the lighting device comprises a temperature sensor for sensing a temperature of a heat sink.

19. The air conditioner of claim 18, wherein, in case a heating or cooling operation is not performed, the blowing fan operates for a preset time based on the temperature of the heat sink sensed by the temperature sensor being higher than a preset temperature.

* * * * *